(12) United States Patent
Lin et al.

(10) Patent No.: US 11,893,221 B2
(45) Date of Patent: Feb. 6, 2024

(54) TEXTURE SHADER GENERATION

(71) Applicant: Lemon Inc., Grand Cayman (KY)

(72) Inventors: Kexin Lin, Los Angeles, CA (US); Qianyi Li, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/572,123

(22) Filed: Jan. 10, 2022

(65) Prior Publication Data
US 2023/0221849 A1   Jul. 13, 2023

(51) Int. Cl.
*G06F 3/04847* (2022.01)
*G06T 15/04* (2011.01)

(52) U.S. Cl.
CPC .......... *G06F 3/04847* (2013.01); *G06T 15/04* (2013.01); *G06T 2200/24* (2013.01)

(58) Field of Classification Search
CPC .. G06F 3/04847; G06T 15/04; G06T 2200/24
See application file for complete search history.

(56) References Cited

U.S. PATENT DOCUMENTS

| | | | | |
|---|---|---|---|---|
| 5,793,374 A | * | 8/1998 | Guenter .................. | G06T 15/50 345/426 |
| 2005/0017973 A1 | * | 1/2005 | Cazabon ................. | G06T 15/50 426/619 |
| 2006/0083417 A1 | | 4/2006 | Dehmeshki | |
| 2016/0063952 A1 | | 3/2016 | Webb | |
| 2016/0110168 A1 | * | 4/2016 | Feder ...................... | G06T 1/20 717/106 |
| 2021/0149549 A1 | | 5/2021 | Ubillos et al. | |

OTHER PUBLICATIONS

"Occluders." Meta Spark. Archived Aug. 7, 2020. Accessed Oct. 11, 2022. https://sparkar.facebook.com/ar-studio/learn/articles/3D/occluders/ (Year: 2020).*
International Search Report dated Aug. 2, 2023 for International Application No. PCT/SG2023/050014.

* cited by examiner

*Primary Examiner* — John T Repsher, III
(74) *Attorney, Agent, or Firm* — Faegre Drinker Biddle & Reath LLP (57) ABSTRACT

A method for generating a texture shader is described. A user interface for editing the texture shader is displayed. The texture shader has a plurality of parameters that affect rendering characteristics of the texture shader. Displaying includes displaying a widget for at least one parameter of the plurality of parameters, and applying the texture shader to an input image using current values of the plurality of parameters to generate a preview of the texture shader. A user input that changes a value of a parameter of the at least one parameter is received via at least one widget. The texture shader is applied to the input image using the changed value of the parameter to generate the preview of the texture shader. The preview of the texture shader applied to the input image is displayed.

14 Claims, 8 Drawing Sheets

TEXTURE SHADER GENERATION

BACKGROUND

Post-processing effects for images or videos are generally written using computer code which is then compiled into a "texture shader." When executed, the texture shader may receive an input, such as an image, video stream, or other texture and augment the input to include a desired post-processing effect. Generally, the texture shader is a type of computer program that describes the characteristics of either a vertex or a pixel within an output image, based on the input image and the computer code.

As one example, a sparkling post-processing effect may use an image or video stream as an input rendering texture and areas of pixels within the texture having largest differences in brightness are considered to be "edges" found in the input rendering texture. After the edges are identified, several points along those edges may be randomly or pseudo-randomly selected and then highlighted with adjacent pixels showing different colors or other effects. However, in order to modify a post-processing effect provided by a texture shader, such as by changing a color or intensity of the highlighted points of the sparkling post-processing effect, the texture shader (e.g., its program code and/or parameters) needs to be modified.

Generally, writing and/or modifying the program code or parameters for texture shaders requires an understanding of computer rendering pipelines as well as programming languages, which increases the complexity of creating new and interesting texture shaders. Moreover, for accurate rendering results, modifications to a visual effect require parameters in the program code to be modified, then the texture shader reloaded for each parameter change, which makes creation and modification of texture shaders a time consuming process. Additionally, modification of the program code for the texture shader may increase a risk of causing a compile error, which will bring unexpected rendering results.

It is with respect to these and other general considerations that examples have been described. Also, although relatively specific problems have been discussed, it should be understood that the examples should not be limited to solving the specific problems identified in the background.

SUMMARY

Aspects of the present disclosure are directed to generating a texture shader.

In one aspect, a method for generating a texture shader is provided. The method includes displaying a user interface for editing the texture shader, the texture shader having a plurality of parameters that affect rendering characteristics of the texture shader, including: displaying a widget for at least one parameter of the plurality of parameters, and applying the texture shader to an input image using current values of the plurality of parameters to generate a preview of the texture shader. The method further includes receiving, via at least one widget, a user input that changes a value of a parameter of the at least one parameter. The method also includes applying the texture shader to the input image using the changed value of the parameter to generate the preview of the texture shader. The method also includes displaying the preview of the texture shader applied to the input image.

In another aspect, a system for generating a texture shader is provided. The system includes one or more hardware processors configured by machine-readable instructions to: display a user interface for editing the texture shader, the texture shader having a plurality of parameters that affect rendering characteristics of the texture shader, including displaying a widget for at least one parameter of the plurality of parameters, and applying the texture shader to an input image using current values of the plurality of parameters to generate a preview of the texture shader; receive, via at least one widget, a user input that changes a value of a parameter of the at least one parameter; apply the texture shader to the input image using the changed value of the parameter to generate the preview of the texture shader; and display the preview of the texture shader applied to the input image.

In yet another aspect, a non-transient computer-readable storage medium is provided. The medium comprises instructions being executable by one or more processors, that when executed by the one or more processors, cause the one or more processors to: display a user interface for editing the texture shader, the texture shader having a plurality of parameters that affect rendering characteristics of the texture shader, including displaying a widget for at least one parameter of the plurality of parameters, and applying the texture shader to an input image using current values of the plurality of parameters to generate a preview of the texture shader; receive, via at least one widget, a user input that changes a value of a parameter of the at least one parameter; apply the texture shader to the input image using the changed value of the parameter to generate the preview of the texture shader; and display the preview of the texture shader applied to the input image.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As previously discussed, writing or modifying the program code or parameters for texture shaders is complex and requires detailed knowledge of programming techniques. The present disclosure describes various examples of systems and methods for generating texture shaders. More specifically, the systems and methods described herein provide a user interface for editing texture shaders. Although a texture shader generally includes many parameters that are coded individually, the user interface displays widgets (i.e., user interface control elements) for the parameters in the user interface to simplify the representation and manipulation of values of the parameters. By using widgets, complexity of adjustments to the parameters and/or program code may be reduced from skilled text entry of program code and parameter values to simply clicking, dragging, or other simple interactions, which makes designing and generating texture shaders easier, faster, and less error prone.

Figure 1:
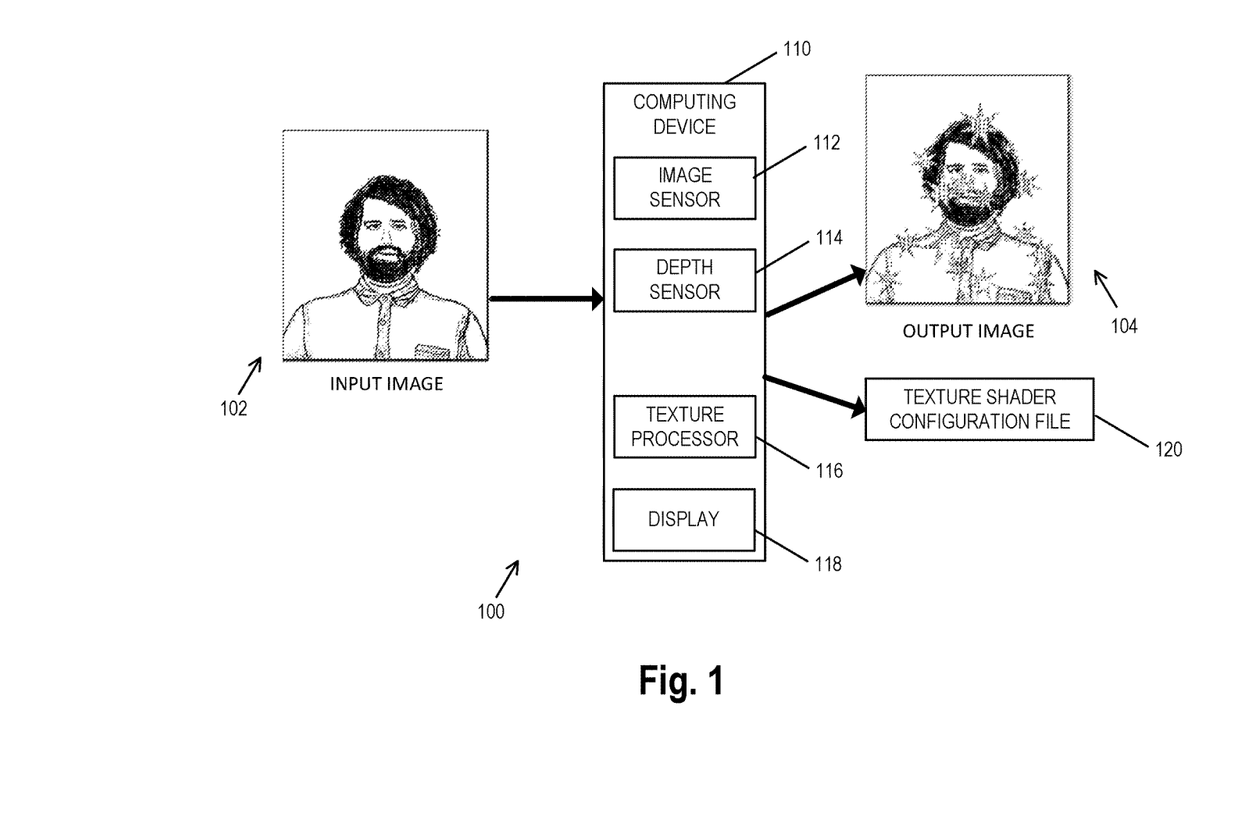
FIG. 1 depicts a block diagram of an example of a system for generating a texture shader in accordance with examples the present disclosure.

This and many further examples for a computing device are described herein. For instance, FIG. 1 shows a block diagram of an example of a system 100 for generating a texture shader, according to an example of the present disclosure. The system 100 includes a computing device 110 that is configured to apply a texture shader (or simply a "shader") to an input image 102 (sometimes referred to as a "texture"), thereby generating an output image 104 having a desired post-processing effect. Although the input image 102 and output image 104 are referred to as individual images, the input image 102 and output image 104 may be videos or streams of images in some examples. Examples of the post-processing effect may include sparkles, bubbles, simulated rain or snow, flashing lights, background lighting, icons, augmented reality features, or other suitable effects. In the example shown in FIG. 1, the output image 104 includes 7-point stars that are generated and displayed over the input image by a texture shader.

The computing device 110 may be any type of computing device, including a smartphone, mobile computer or mobile computing device (e.g., a Microsoft® Surface® device, a laptop computer, a notebook computer, a tablet computer such as an Apple iPad™ a netbook, etc.), or a stationary computing device such as a desktop computer or PC (personal computer). The computing device 110 may be configured to communicate with a social media platform, cloud processing provider, software as a service provider, or other suitable entity, for example, using social media software and a suitable communication network. The computing device 110 may be configured to execute one or more software applications (or "applications") and/or services and/or manage hardware resources (e.g., processors, memory, etc.), which may be utilized by users of the computing device 110.

Computing device 110 may include an image sensor 112, a depth sensor 114, a texture processor 116, and a display 118. The image sensor 112 is configured to capture images and/or video of a subject, for example, a user of the computing device 110 or other suitable subject. The image sensor 112 may be a front-facing "selfie" camera or rear-facing camera of a smartphone, for example. The depth sensor 114 is configured to estimate a distance between the computing device 110 and the subject, for example, estimating a distance to the hands, arms, feet, and/or head of the subject. The depth sensor 114 may provide depth information that augments the images captured by the image sensor 112, providing for estimates of a three-dimensional positioning of the subject.

The texture processor 116 is configured to generate and display a user interface for editing texture shaders and to apply the texture shaders, for example, to the input image 102. Advantageously, the user interface allows a user to adjust or modify the texture shaders using simple interactions (e.g., clicking, dragging, or simple text entry) instead of writing program code or scripts (e.g., JavaScript, TypeScript, C, C#, Python). For example, a texture shader may have a plurality of parameters that affect a post-processing effect defined by the texture shader and the user interface may allow for changes to the parameters using widgets (e.g., graphical user interface controls). In some examples, the texture processor 116 is also configured to generate a texture shader configuration file 120 that defines the plurality of parameters for a texture shader. For example, after a user has previewed several iterations of a texture shader with different parameter values, the user may export current values of the plurality of parameters to the texture shader configuration file 120 so that the texture shader may be shared with other users and/or computing devices. In some examples, the texture shader configuration file 120 may be sold, either individually or as part of a package of texture shaders, so that other users may create content (i.e., output image 104) to be posted on social media networks.

The display 118 is configured to show a user interface of the computing device 110. In various examples, the display 118 is a touchscreen display of a smartphone, a monitor for a desktop computer, etc. The display 118 may be configured to display the user interface for editing the texture shader and the output image 104. The output image 104 may provide real-time feedback to a user as they adjust a shader, for example.

Figure 2:
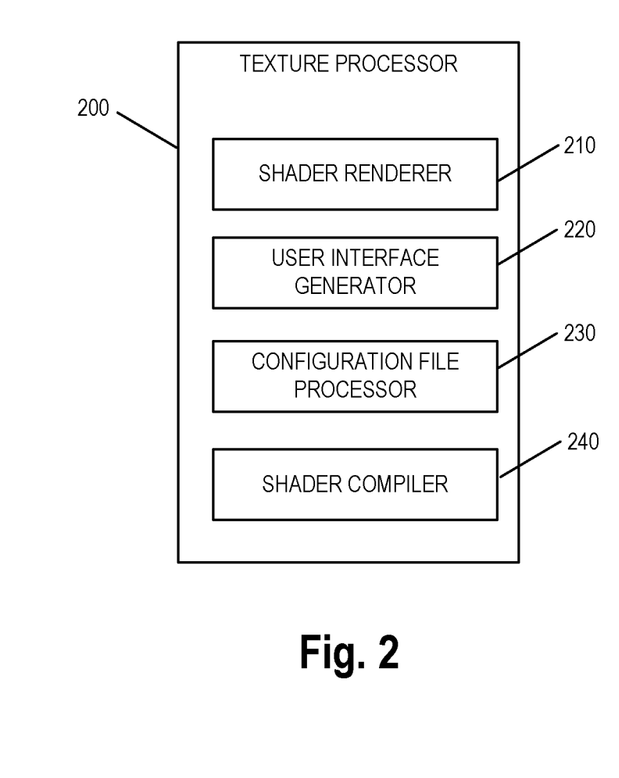
FIG. 2 depicts a block diagram of an example of a texture processor of a computing device in accordance with examples the present disclosure.

FIG. 2 depicts a block diagram of an example of a texture processor 200 of a computing device in accordance with examples the present disclosure. In some examples, the texture processor 200 generally corresponds to the texture processor 116 and generates a user interface for editing texture shaders, etc. The texture processor 200 may include a shader renderer 210, a user interface generator 220, a configuration file processor 230, and a shader compiler 240. In examples, at least some of the shader renderer 210, the user interface generator 220, the configuration file processor 230, and the shader compiler 240 may be combined into fewer modules (e.g., combining the configuration file processor 230 with the user interface generator 220).

The shader renderer 210 is configured to apply texture shaders to an input image (e.g., input image 102) using current values of parameters for the texture shaders. For example, the shader renderer 210 executes program code for a texture shader that manipulates values for pixels (e.g., RGB values or other suitable visual parameters) of the input image 102. As one example, a texture shader may contain program code that identifies an outline of a subject within an input image and applies star-shaped icons to the subject by changing RGB values near selected locations along the outline (e.g., within 5 pixels, 20 pixels). In some examples, application of the texture shader is based on an image or texture that defines an appearance of the star-shaped icons (or other suitable visual effect). In these examples, the shader renderer 210 is configured to open, load, and/or process the texture to apply the texture shader. In some examples, the texture is selected by the user via the user interface.

The user interface generator 220 is configured to generate a graphical user interface for editing texture shaders. For example, the user interface generator 220 may generate various widgets, such as buttons, check boxes, toggles, sliders, spinners, combo boxes, color pickers, text boxes, or other suitable widgets. Generally, the graphical user interface is configured to show the user a representation of values of parameters for a texture shader and to allow the user to manipulate those values, thereby changing a visual appearance of the output image 104.

The configuration file processor 230 is configured to read and write configuration files for texture shaders. A configuration file may include program code, adjustable and/or static parameters, comments, links or references to other configuration files or program modules (e.g., video rendering engines or pipelines), or other suitable information. Generally, the shader renderer 210 may be configured to apply a post-processing effect based on information within a configuration file corresponding to the post-processing effect. In some examples, the configuration file processor 230 reads a configuration file, identifies parameters that are adjustable, and provides those parameters to the user interface generator 220, which may then generate a suitable user interface having widgets for those adjustable parameters. After adjustment of parameters by the user, the configuration file processor 230 may update or create a new configuration file that includes current values of the texture shader.

The shader compiler 240 is configured to compile program code for texture shaders, for example, when the program code is written in a compiled language such as C or C#. In some examples, the shader compiler 240 is configured to compile and/or recompile a texture shader as a background operation using changed values of parameters in real-time or near-real time. The shader compiler 240 may be configured to utilize various program modules (e.g., video rendering engines or pipelines) or software libraries to compile program code for a texture shader. In some examples, the shader compiler 240 performs just-in-time compiling for texture shaders. For example, when a user selects a texture shader for use, the shader compiler 240 then compiles the program code for the texture shader and provides an executable output to the shader renderer 210. In some examples, the executable output is a temporary executable output that is discarded after each use.

Figure 3:
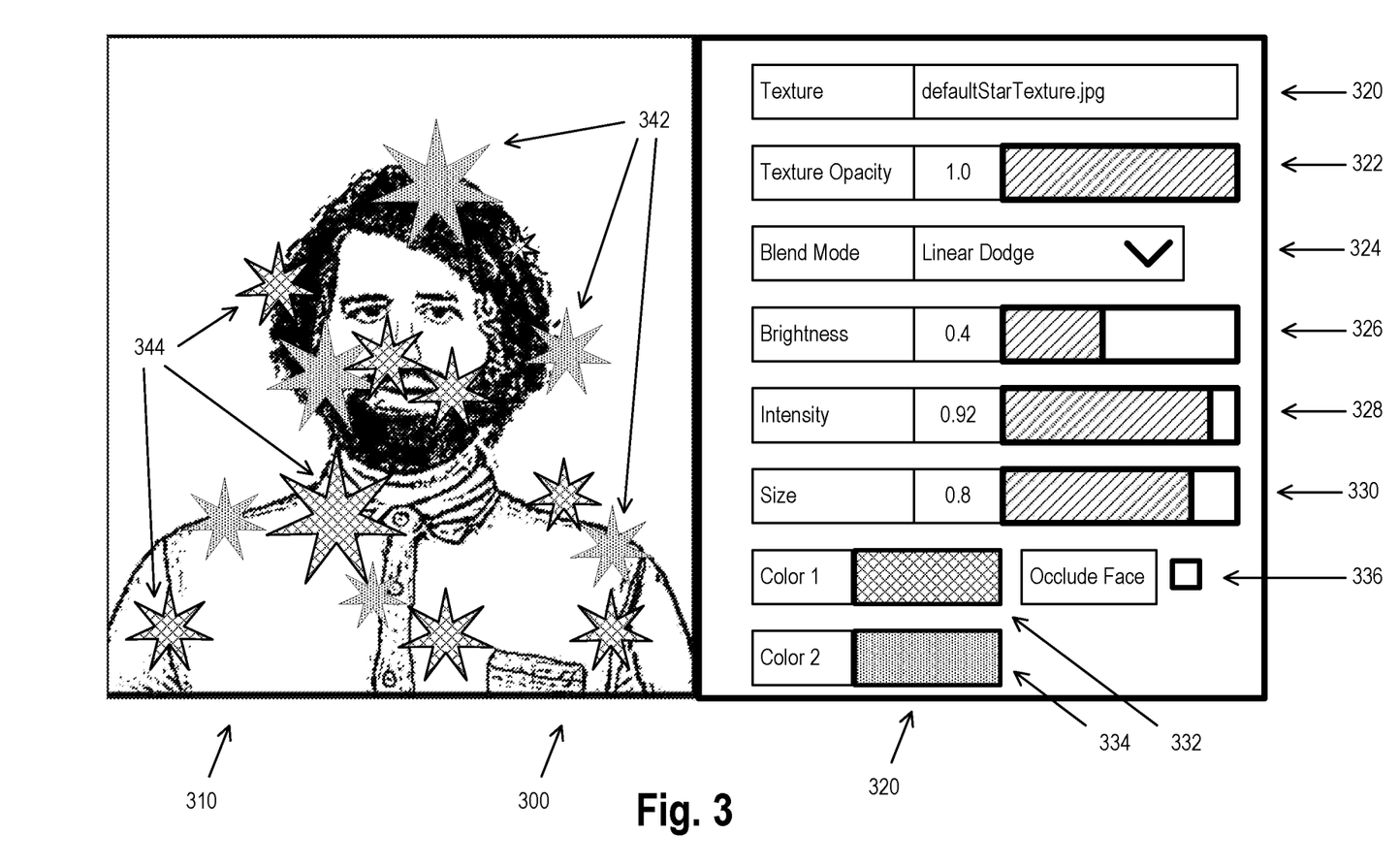
FIG. 3 depicts a diagram of an example graphical user interface for generating a texture shader in accordance with examples the present disclosure.

FIG. 3 depicts a diagram of an example graphical user interface ("GUI") 300 for generating a texture shader in accordance with examples the present disclosure. The GUI 300 may be generated by the texture processor 116 or the texture processor 200 (e.g., by the user interface generator 220), in various examples. The GUI 300 includes a preview pane 310 and a parameter pane 320. Generally, a texture shader includes program code having a plurality of parameters that affect rendering characteristics of the texture shader. The user interface generator 220 may generate the parameter pane 320 to include widgets for some or all of the plurality of parameters of the texture shader. In some examples, various parameters may have predetermined values, required values, or be identified as being "private" parameters and may not have a corresponding widget within the parameter pane 320. For example, some parameters may identify a required operating system environment of the texture shader, such as Android, iOS, or Windows to prevent its use on incompatible computing devices. As such, parameters that are not adjustable by the user may be omitted from the parameter pane 320. In other examples, parameters that are not adjustable are shown with a widget that is inactive or greyed out.

In the example GUI 300 shown in FIG. 3, the parameter pane 320 includes a texture widget 320, a texture opacity widget 322, a blend mode widget 324, a brightness widget 326, an intensity widget 328, a size widget 330, a first color widget 332, a second color widget 334, and a facial occlusion widget 336. In other examples, the parameter pane 320 may include additional or fewer widgets. When a large number of parameters are available for adjustment, the parameter pane 320 may be organized with multiple tabs (not shown), each tab showing a different set of parameters.

The texture widget 320 is configured to prompt the user for selection of a texture to be applied by the texture processor 200. In the example shown in FIG. 3, the texture is an image file ("defaultStarTexture.jpg") of a 7-point star and the texture is applied at a plurality of points within the input image 102. In other examples, the texture widget 320 may also include a preview window of a raw texture (i.e., before being processed by the texture processor 200). Although only one texture widget 320 is shown, the texture processor 200 may support additional texture widgets for two, three, or more textures to be applied simultaneously to an input image 102. In some examples where additional textures are utilized, the parameters may be organized by tabs, as described above.

The texture opacity widget 322 includes a slider and display value for a current value of opacity of the texture, for example, from 0.0 (fully transparent) to 1.0 (fully opaque). Advantageously, the slider prevents a user from entering an invalid value (e.g., −3 or 27) that could lead to a compilation error or crash of the texture shader.

The blend mode widget 324 includes a drop-down box for selection of a blend mode between different layers of the output image 104, where the input image 102 represents one layer and each texture shader represents an additional layer. Examples of blend modes may include Normal, Multiply, Overlay, Add, Screen, Soft Light, Color Burn, Color Dodge, Darken, Lighten, Linear Dodge, or other suitable blend modes.

The brightness widget 326 includes a slider and display value for a current value of brightness of the texture, for example, from 0.0 (minimal brightness) to 1.0 (full brightness).

The intensity widget 328 includes a slider and display value for a current value of intensity of the texture, for example, from 0.0 (minimal intensity) to 1.0 (full intensity).

The size widget 330 includes a slider and display value for a current value of size of the texture, for example, from 0.0 (smallest size, e.g., 1 pixel) to 1.0 (largest size, e.g., 50 pixels or 10% of an output image size).

The first color widget 332 and the second color widget 334 include color pickers for selection of colors (e.g., RGB values, CMYK values, etc.) to be applied with the selected texture. In the example shown in FIG. 3, textures 342 have a color corresponding to the second color widget 334 and textures 344 have a color corresponding to the first color widget 332.

The facial occlusion widget 336 includes a checkbox for enabling or disabling a facial occlusion feature. When enabled, the shader renderer 210 is configured to identify a facial region of a subject (or subjects) and omit the facial region from processing so that the output image 104 is generally "clean" and unprocessed (or minimally processed) as compared to the input image 102. The shader renderer 210 may identify a facial region by identifying key points of a face, such as eyes and a mouth, and applying a mask to a surrounding area. In other examples, the shader renderer 210 includes a facial recognition engine (not shown) that identifies a mask for a face within the input image 102. In some examples, the facial region is excluded from further processing. In other examples, the facial region is processed at a reduced level, for example, using a lower texture opacity, brightness, intensity, and/or size as compared to areas outside of the facial region. In this way, the face is not obscured by the effects of the texture shader, which may be more desirable to the user.

The preview pane 310 is configured to show a preview of a texture shader using current values of parameters, for example, values as shown in the parameter pane 320. Although only a single image is shown in FIG. 3, the preview pane 310 is configured to show a video (or stream of images) with the texture shader applied to individual frames of the video. In some examples, the visual effects of the texture shader are variable over time, for example, as a random or pseudo-random sequence of stars (or other suitable textures) applied over the input image 102 (or an input video).

Figure 4:
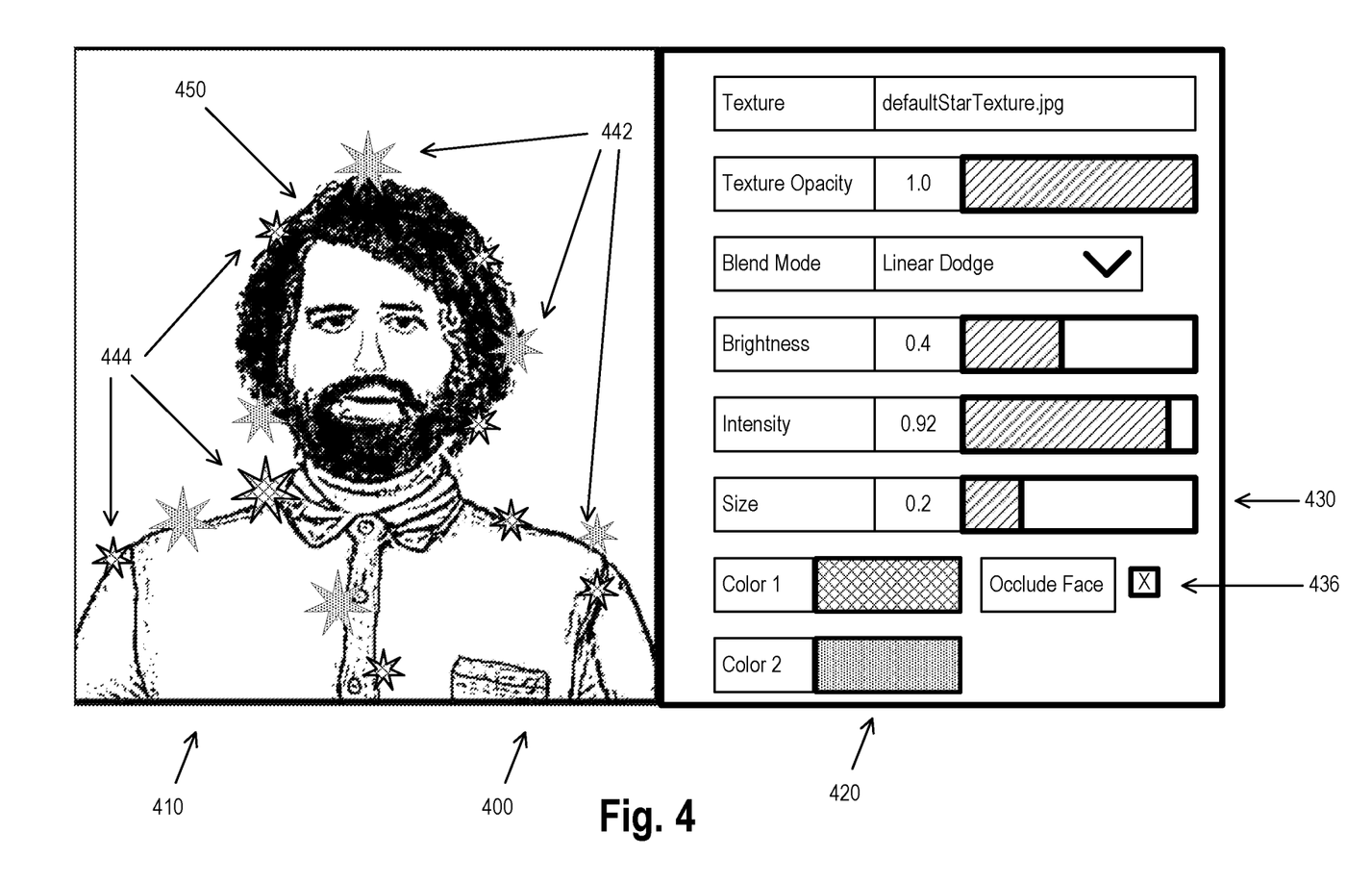
FIG. 4 depicts a diagram of another example of a graphical user interface in accordance with examples the present disclosure.

FIG. 4 depicts a diagram of another example of a graphical user interface 400 in accordance with examples of the present disclosure. The graphical user interface 400 generally corresponds to the graphical user interface 300, but taken at a different time where several parameters have been adjusted. The graphical user interface 400 includes a preview pane 410 showing textures 442 and textures 444, along with a parameter pane 420. The parameter pane 420 generally corresponds to the parameter pane 320, but with a different value for the size widget 430 (0.2 vs. 0.8), accordingly the textures 442 and 444 are smaller than the textures 342 and 344. Additionally, a facial occlusion widget 436 has been activated so that a facial region 450 of a subject is generally omitted from processing by the texture processor 200.

Figure 5:
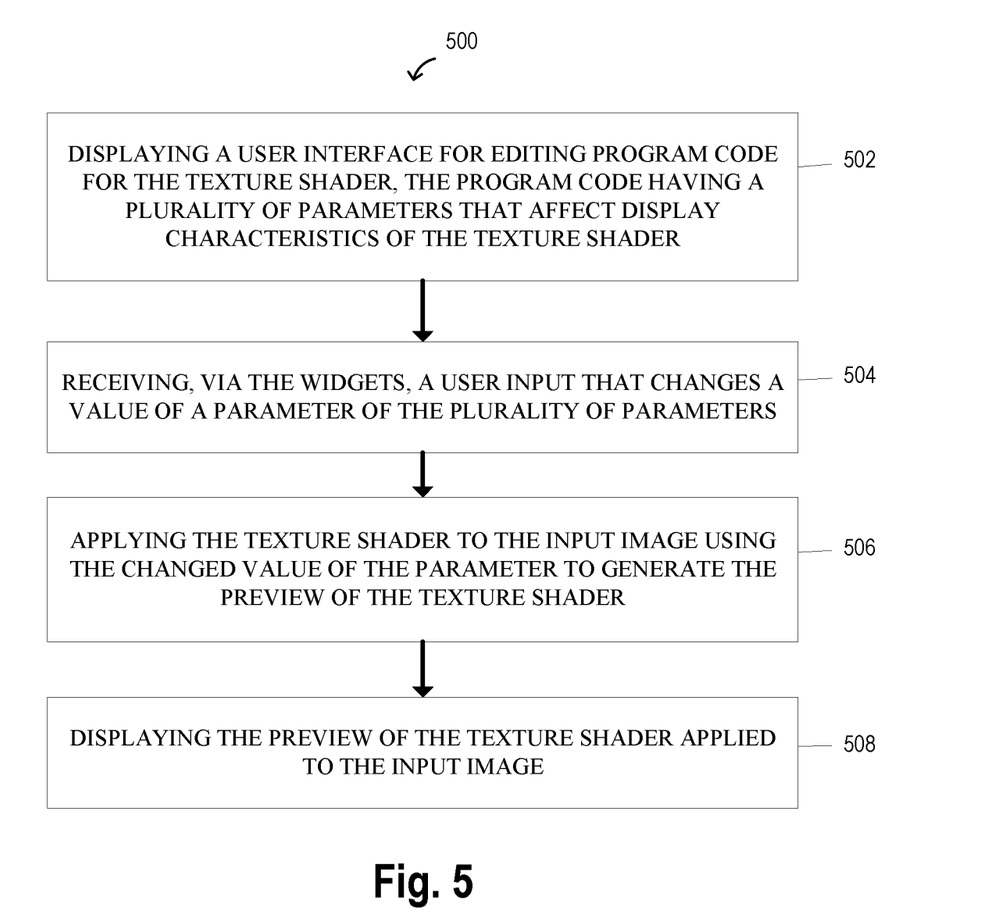
FIG. 5 depicts a flowchart of an example method of generating a texture shader in accordance with examples the present disclosure.

FIG. 5 depicts a flowchart of an example method 500 of generating a texture shader in accordance with examples the present disclosure. Technical processes shown in these figures may be performed automatically unless otherwise indicated. In any given example, some steps of a process may be repeated, perhaps with different parameters or data to operate on. Steps in an example may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the texture processor 116, the display 118), the texture processor 200 (e.g., via the shader renderer 210, the user interface generator 220, the configuration file processor 230, and/or the shader compiler 240), or another suitable computing device.

Method 500 begins with step 502. At step 502, a user interface for editing the texture shader is displayed. The texture shader may have a plurality of parameters that affect rendering characteristics of the texture shader. Step 502 may include displaying respective widgets for each of the plurality of parameters, and applying the texture shader to an input image using current values of the parameters from the widgets to generate a preview of the texture shader. The user interface may correspond to the graphical user interface 300 or the graphical user interface 400, for example.

At step 504, a user input that changes a value of a parameter of the plurality of parameters may be received via the widgets. The user input may correspond to a change in value of a parameter for the size widget 430, for example.

At step 506, the texture shader may be applied to the input image using the changed value of the parameter to generate the preview of the texture shader. For example, the texture shader of FIG. 3 and FIG. 4 may be applied to the input image 102 to generate an output image as shown in the preview pane 410, for example. In some examples, applying the texture shader to the input image using the changed value of the parameter may include recompiling the texture shader as a background operation using the changed value of the parameter.

At step 508, the texture shader and/or a preview of the texture shader may be applied to the input image such that an output image having the applied texture may be generated, displayed, and/or stored.

In some examples, the method 500 may further include generating a configuration file for the texture shader using current values of the plurality of parameters as stored values, where the configuration file configures a processor to execute the texture shader using the stored values. In some examples, the method 500 may further include reading a configuration file for the texture shader, where the configuration file identifies the plurality of parameters, and generating the user interface based on the configuration file. In some examples, generating the user interface may include determining a widget type for each of the plurality of parameters; and generating a corresponding widget of the determined widget type.

In some examples, the respective widgets are configured for representation and manipulation of values of the corresponding parameters. In some examples, the respective widgets are ones of buttons, check boxes, toggles, sliders, spinners, combo boxes, color pickers, and/or text boxes. The plurality of parameters may be ones of texture opacity, brightness, intensity, texture size, and/or texture size randomness. The respective widgets may include a texture picker for selection of the texture. The respective widgets may include a facial occlusion widget that, when activated, omits identified facial regions of the input image from application of the texture shader.

Figure 6:
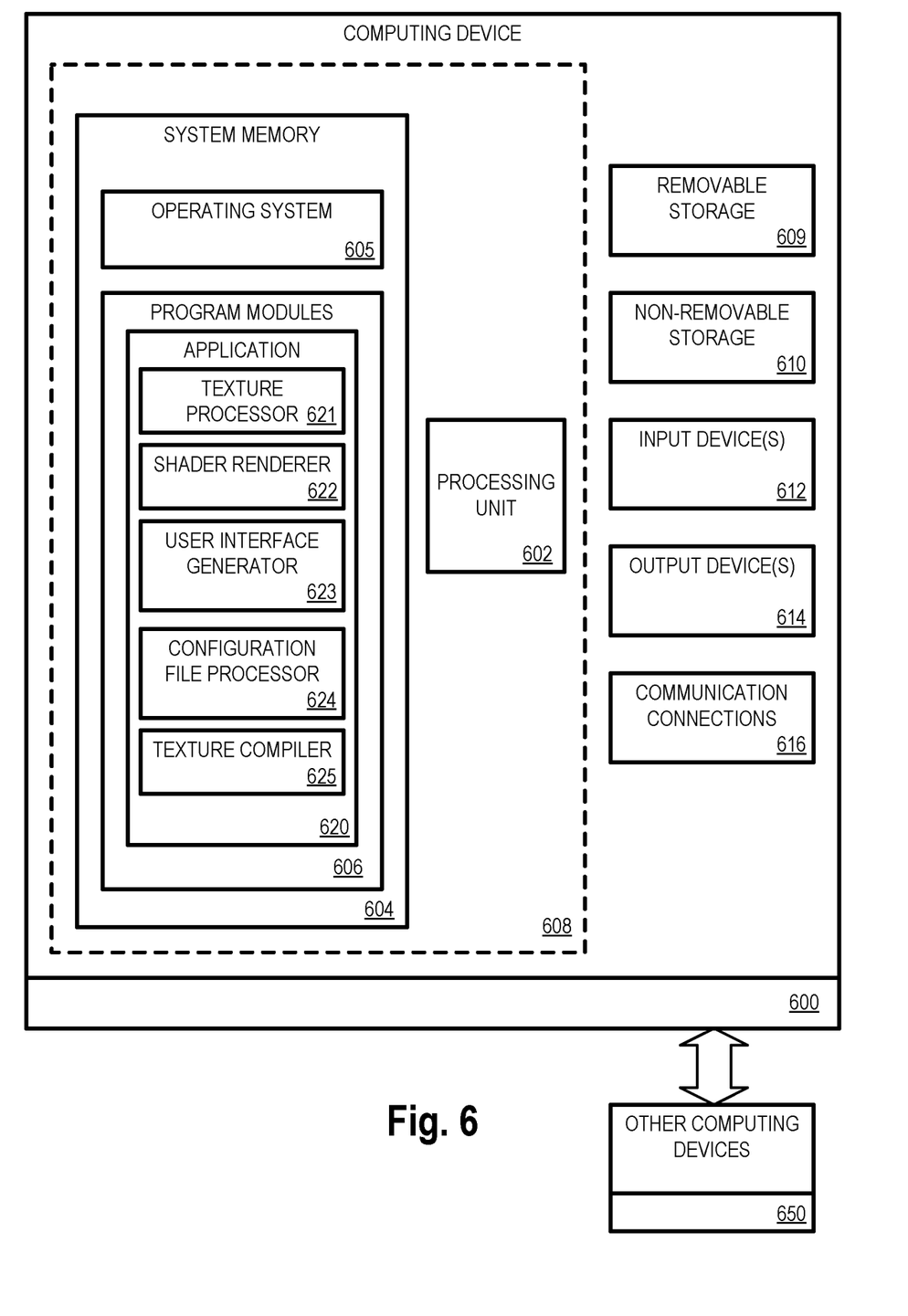
FIG. 6 is a block diagram illustrating example physical components of a computing device with which aspects of the disclosure may be practiced.
Figure 7:
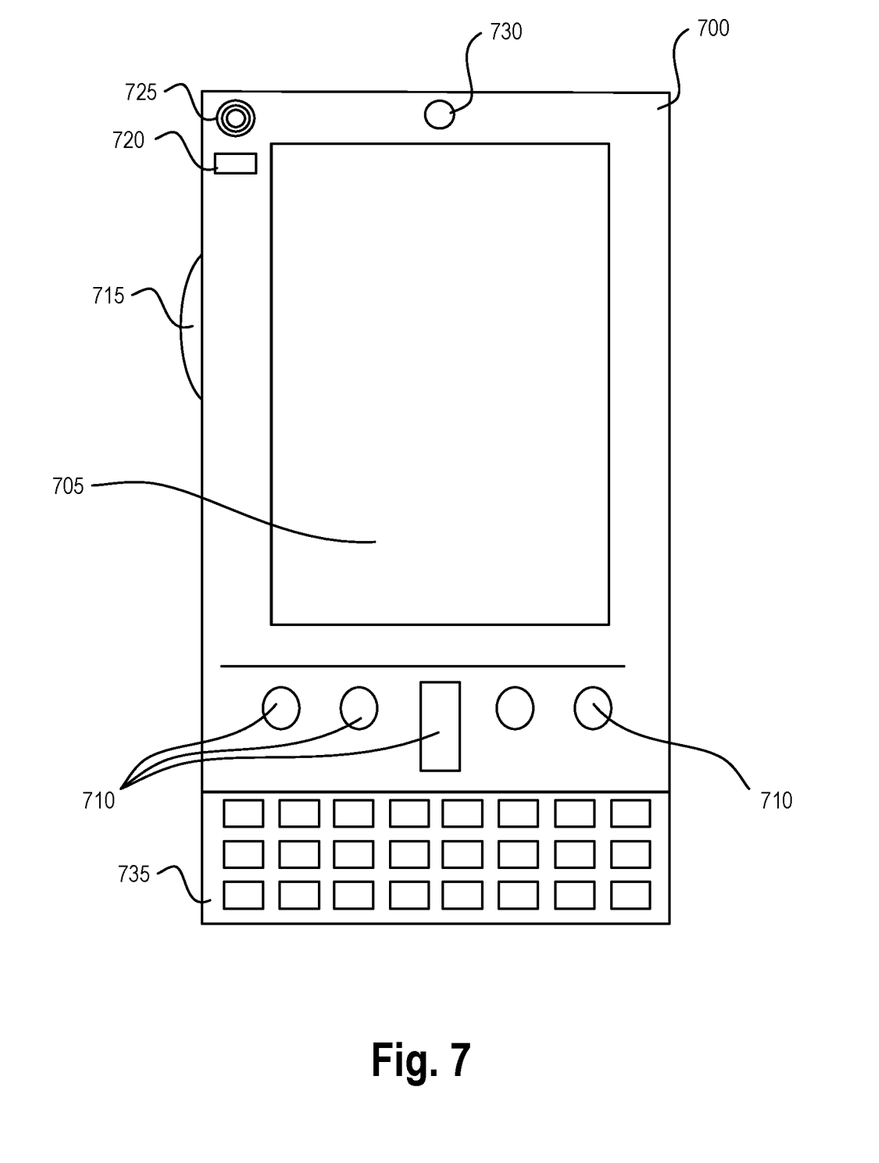
FIGS. 7 and 8 are simplified block diagrams of a mobile computing device with which aspects of the present disclosure may be practiced.
Figure 8:
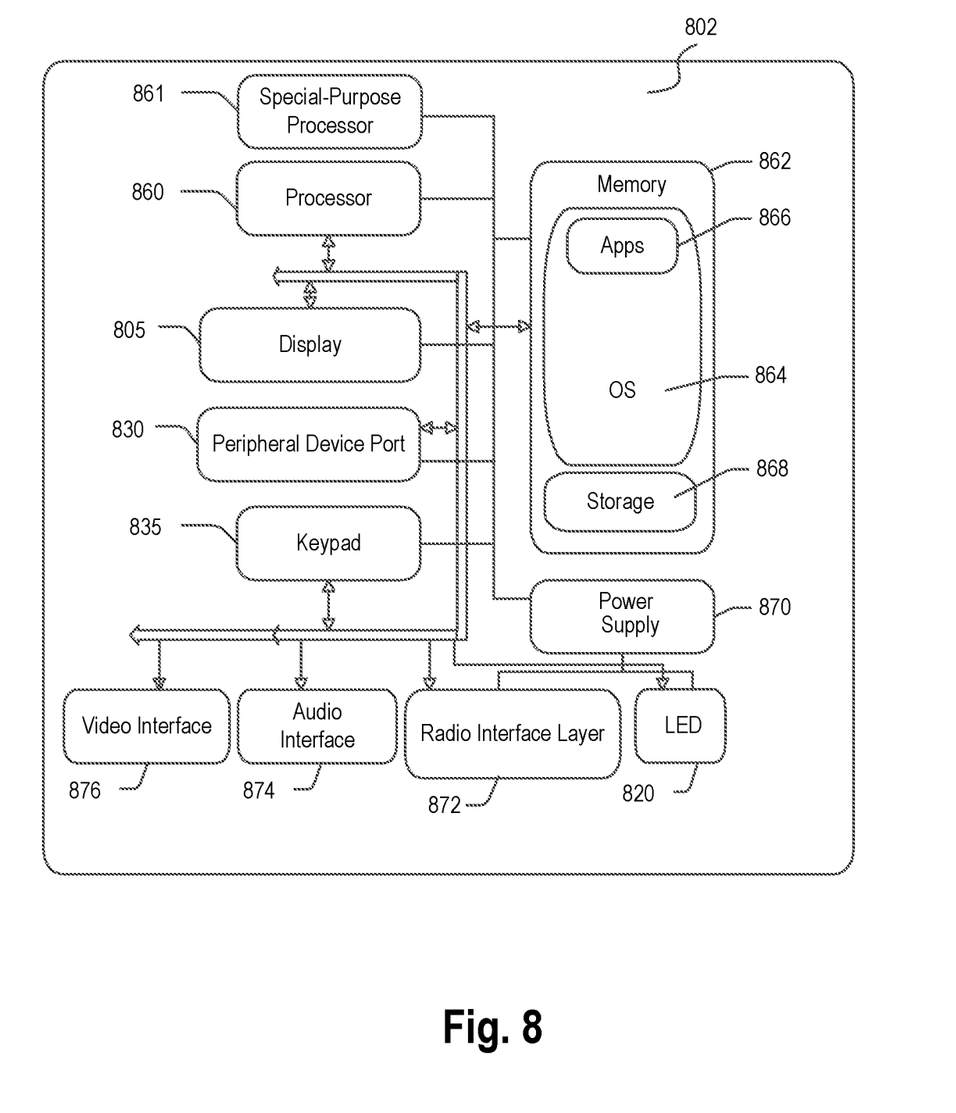

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing a texture shader generator application 620 on a computing device (e.g., computing device 110), including computer executable instructions for texture shader generator application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running texture shader generator application 620, such as one or more components with regard to FIGS. 1 and 2, and, in particular, texture processor 621 (e.g., corresponding to texture processor 116 or texture processor 200), shader renderer 622 (e.g., corresponding to shader renderer 210), user interface generator 623 (e.g., corresponding to user interface generator 220), configuration file processor 624 (e.g., corresponding to configuration file processor 230), and shader compiler 625 (e.g., corresponding to shader compiler 240).

The operating system 605, for example, may be suitable for controlling the operation of the computing device 600. Furthermore, examples of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., texture shader generator application 620) may perform processes including, but not limited to, the aspects, as described herein. Other program modules that may be used in accordance with aspects of the present disclosure, and in particular for generating a texture shader, may include texture processor 621, shader renderer 622, user interface generator 623, configuration file processor 624, and shader compiler 625.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which examples of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some examples. In yet another alternative example, the mobile computing device 700 is a portable phone system, such as a cellular phone. The mobile computing device 700 may include a front-facing camera 730. The mobile computing device 700 may also include an optional keypad 735. Optional keypad 735 may be a physical keypad or a "soft" keypad generated on the touch screen display. In various examples, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one example, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone. The system 802 may include a display 805 (analogous to display 705), such as a touch-screen display or other suitable user interface. The system 802 may also include an optional keypad 835 (analogous to keypad 735) and one or more peripheral device ports 830, such as input and/or output ports for audio, video, control signals, or other suitable signals.

The system 802 may include a processor 860 coupled to memory 862, in some examples. The system 802 may also include a special-purpose processor 861, such as a neural network processor. One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated example, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with examples of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for generating a texture shader according to at least the examples provided in the sections below:

(A1) In one aspect, some examples include a method for generating a texture shader. The method includes displaying a user interface for editing the texture shader, the texture shader having a plurality of parameters that affect rendering characteristics of the texture shader, including: displaying a widget for at least one parameter of the plurality of parameters, and applying the texture shader to an input image using current values of the plurality of parameters to generate a preview of the texture shader; receiving, via at least one widget, a user input that changes a value of a parameter of the at least one parameter; applying the texture shader to the input image using the changed value of the parameter to generate the preview of the texture shader; and displaying the preview of the texture shader applied to the input image.

(A2) In some examples of A1, the method further comprises: generating a configuration file for the texture shader using current values of the plurality of parameters as stored values, wherein the configuration file configures a processor to execute the texture shader using the stored values.

(A3) In some examples of A1-A2, the method further comprises: reading a configuration file for the texture shader, the configuration file identifying the plurality of parameters; and generating the user interface based on the configuration file.

(A4) In some examples of A1-A3, generating the user interface comprises: determining a widget type for each of the plurality of parameters; and generating a corresponding widget of the determined widget type.

(A5) In some examples of A1-A4, the respective widgets are configured for representation and manipulation of values of the corresponding parameters.

(A6) In some examples of A1-A5, the respective widgets are ones of buttons, check boxes, toggles, sliders, spinners, combo boxes, color pickers, and/or text boxes.

(A7) In some examples of A1-A6, the plurality of parameters are ones of texture opacity, brightness, intensity, texture size, and/or texture size randomness.

(A8) In some examples of A1-A7, the respective widgets include a texture picker for selection of the texture.

(A9) In some examples of A1-A8, the respective widgets include a facial occlusion widget that, when activated, omits identified facial regions of the input image from application of the texture shader.

(A10) In some examples of A1-A9, applying the texture shader to the input image using the changed value of the parameter comprises recompiling the texture shader as a background operation using the changed value of the parameter.

In yet another aspect, some examples include a computing system including one or more processors and memory coupled to the one or more processors, the memory storing one or more instructions which when executed by the one or more processors, causes the one or more processors perform any of the methods described herein (e.g., A1-A14 described above).

In yet another aspect, some examples include a non-transitory computer-readable storage medium storing one or more programs for execution by one or more processors of a storage device, the one or more programs including instructions for performing any of the methods described herein (e.g., A1-A14 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a texture shader, the method comprising:
    reading a configuration file for the texture shader, the configuration file identifying a plurality of parameters that affect rendering characteristics of the texture shader;
    generating a user interface for editing the texture shader based on the configuration file, wherein generating the user interface comprises:
        for each of the plurality of parameters that is adjustable, determining a widget type for the adjustable parameter, and
        generating a corresponding widget of the determined widget type for each of the adjustable parameters;
    displaying the user interface for editing the texture shader, including:
        displaying the generated widget for each adjustable parameter of the plurality of parameters, and
        applying the texture shader to an input image using current values of the plurality of parameters to generate a preview of the texture shader;
    receiving, via at least one widget for the adjustable parameters, a user input that changes a value of a corresponding adjustable parameter of the plurality of parameters;
    applying the texture shader to the input image using the changed value of the adjustable parameter to generate the preview of the texture shader;
    displaying the preview of the texture shader applied to the input image;
    receiving, via the at least one widget for the adjustable parameters, another user input that activates a facial occlusion widget;
    applying the texture shader to the input image using the changed value of the adjustable parameter to generate a second preview of the texture shader, wherein the facial occlusion widget that, when activated, omits identified facial regions of the input image from application of the texture shader, the identified facial regions not being obscured by the effects of the texture shader; and displaying the second preview of the texture shader applied to the input image.

2. The method of claim 1, the method further comprising: generating a configuration file for the texture shader using the current values of the plurality of parameters as stored values, wherein the configuration file configures a processor to execute the texture shader using the stored values.

3. The method of claim 1, wherein the at least one widget is configured for representation and manipulation of the value of the corresponding adjustable parameter.

4. The method of claim 1, wherein the at least one widget is one of a button, a check box, a toggle, a slider, a spinner, a combo box, a color picker, and a text box.

5. The method of claim 1, wherein the plurality of parameters are ones of texture opacity, brightness, intensity, texture size, and/or texture size randomness.

6. The method of claim 1, wherein the at least one widget includes a texture picker for selection of a texture.

7. The method of claim 1, wherein the facial occlusion widget that, when activated, identifies at least one facial region of the input image and omits identified facial regions of the input image from application of the texture shader, and wherein a shader render identifies at least one facial region of the input image to be omitted from application of the texture shader by identifying key points of a face and applying a mask to a surrounding area of the identified key points of the face.

8. The method of claim 1, wherein applying the texture shader to the input image using the changed value of the parameter comprises recompiling the texture shader as a background operation using the changed value of the parameter.

9. A system for generating a texture shader, the system comprising:

one or more hardware processors configured by machine-readable instructions to:

read a configuration file for the texture shader, the configuration file identifying a plurality of parameters that affect rendering characteristics of the texture shader;

generate a user interface for editing the texture shader based on the configuration file, wherein generating the user interface comprises:

for each of the plurality of parameters that is adjustable, determining a widget type for the adjustable parameter, and generating a corresponding widget of the determined widget type for each of the adjustable parameters;

display the user interface for editing the texture shader, including displaying the generated widget for each adjustable parameter of the plurality of parameters, and applying the texture shader to an input image using current values of the plurality of parameters to generate a preview of the texture shader;

receive, via at least one widget for the adjustable parameters, a user input that changes a value of a corresponding adjustable parameter of the plurality of parameters;

apply the texture shader to the input image using the changed value of the adjustable parameter to generate the preview of the texture shader;

display the preview of the texture shader applied to the input image;

receive, via the at least one widget for the adjustable parameters, another user input that activates a facial occlusion widget;

apply the texture shader to the input image using the changed value of the adjustable parameter to generate a second preview of the texture shader, wherein the facial occlusion widget that, when activated, omits identified facial regions of the input image from application of the texture shader, the identified facial regions not being obscured by the effects of the texture shader; and display the second preview of the texture shader applied to the input image.

10. The system of claim 9, wherein the one or more hardware processors are further configured by machine-readable instructions to:

generate a configuration file for the texture shader using the current values of the plurality of parameters as stored values, wherein the configuration file configures a processor to execute the texture shader using the stored values.

11. The system of claim 9, wherein the at least one widget is configured for representation and manipulation of the value of the corresponding adjustable parameter.

12. A non-transitory computer-readable storage medium comprising instructions being executable by one or more processors, that when executed by the one or more processors, cause the one or more processors to:

read a configuration file for the texture shader, the configuration file identifying a plurality of parameters that affect rendering characteristics of the texture shader;

generate a user interface for editing the texture shader based on the configuration file, wherein generating the user interface comprises:

for each of the plurality of parameters that is adjustable, determining a widget type for the adjustable parameter, and generating a corresponding widget of the determined widget type for each of the adjustable parameters;

display the user interface for editing a texture shader, including displaying the generated widget for each adjustable parameter of the plurality of parameters, and applying the texture shader to an input image using current values of the plurality of parameters to generate a preview of the texture shader;

receive, via at least one widget for the adjustable parameters, a user input that changes a value of a corresponding adjustable parameter of the plurality of parameters;

apply the texture shader to the input image using the changed value of the adjustable parameter to generate the preview of the texture shader;

display the preview of the texture shader applied to the input image;

receive, via the at least one widget for the adjustable parameters, another user input that activates a facial occlusion widget;

apply the texture shader to the input image using the changed value of the adjustable parameter to generate a second preview of the texture shader, wherein the facial occlusion widget that, when activated, omits identified facial regions of the input image from application of the texture shader, the identified facial regions not being obscured by the effects of the texture shader; and display the second preview of the texture shader applied to the input image.

13. The non-transitory computer-readable storage medium of claim 12, wherein the instructions are executable by the one or more processors to cause the one or more processors to:

generate a configuration file for the texture shader using the current values of the plurality of parameters as stored values, wherein the configuration file configures a processor to execute the texture shader using the stored values.

14. The non-transitory computer-readable storage medium of claim 12, wherein the at least one widget is configured for representation and manipulation of the value of the corresponding adjustable parameter.

* * * * *